UNITED STATES PATENT OFFICE.

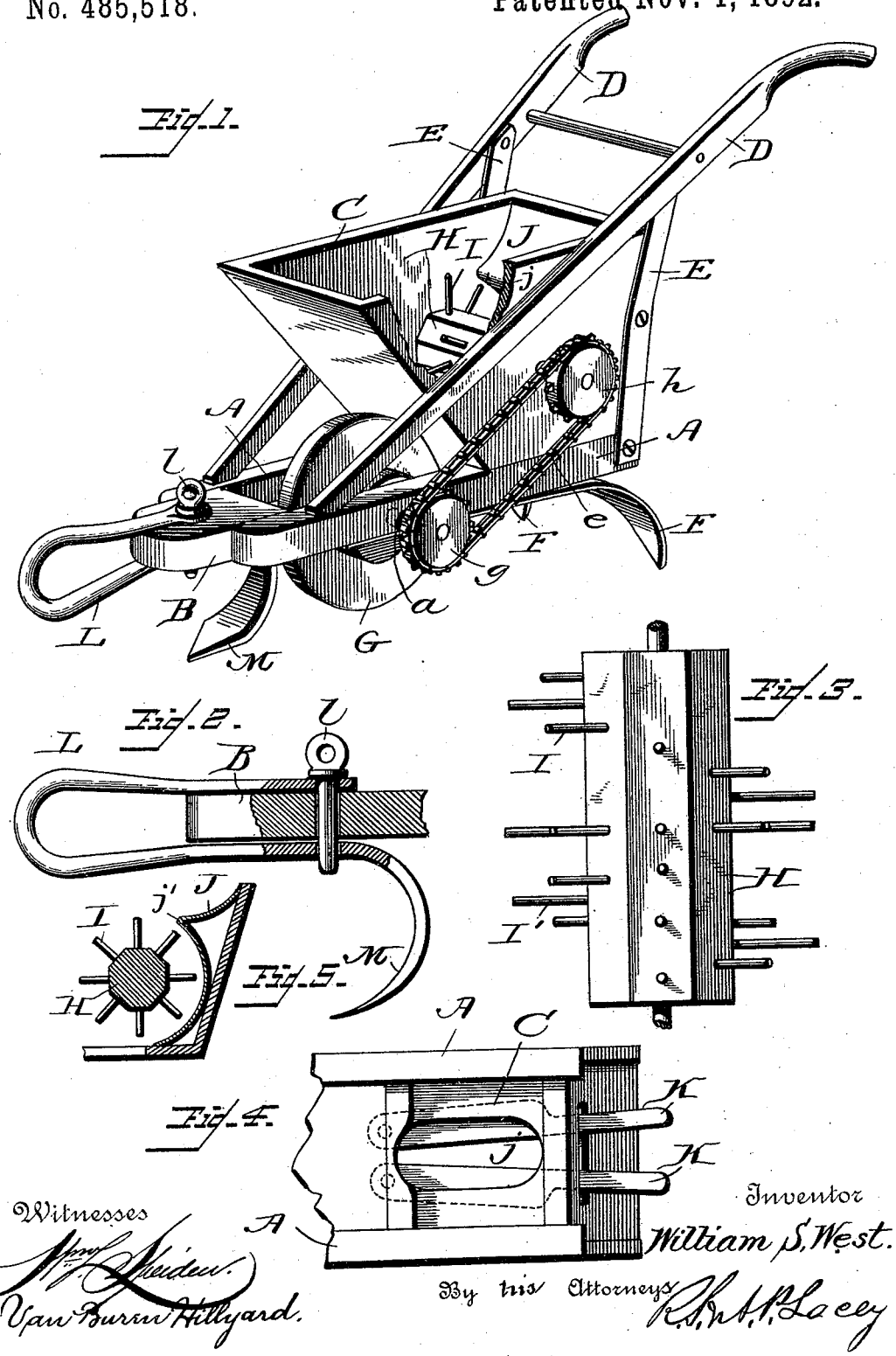

WILLIAM SMITH WEST, OF TEMPLE, GEORGIA.

COTTON-SEED PLANTER.

SPECIFICATION forming part of Letters Patent No. 485,518, dated November 1, 1892.

Application filed May 25, 1892. Serial No. 434,287. (No model.)

*To all whom it may concern:*

Be it known that I, WILLIAM SMITH WEST, a citizen of the United States, residing at Temple, in the county of Carroll, State of Georgia, have invented certain new and useful Improvements in Cotton-Seed Planters; and I do hereby declare the following to be a full, clear, and exact description of the invention, such as will enable others skilled in the art to which it appertains to make and use the same.

My invention relates to planters of that class which is especially designed for sowing cotton-seed.

The object of the invention is to provide a machine of simple construction which will perform the work in a rapid and efficient manner and which will positively force the seed from the hopper and prevent the same lodging or banking therein.

The improvement consists of the novel features and the peculiar construction and combination of the parts, which will be hereinafter more fully described and claimed, and which are shown in the annexed drawings, in which—

Figure 1 is a perspective view of a planter embodying my invention, parts being broken away. Fig. 2 is a side elevation of the combined clevis and plow or opener. Fig. 3 is a detail view of the feed-roller, showing the double arrangement of the teeth thereon. Fig. 4 is a detail view showing the cut-offs for regulating the size of the opening in the bottom of the hopper. Fig. 5 is a detail view showing the relative disposition of the feed-roller and the sheet-metal strip forming the rear wall of the hopper.

The frame of the planter comprises two side beams A and an end piece B, which is secured between the said beam A at the front end thereof. The hopper C is mounted on the rear ends of the beam A and a portion extends between the said beams to hold them at a fixed relative distance apart. The handles D are secured at their front ends to the beams A and at a short distance from said ends to the sides of the hopper, and are strengthened near their upper ends by being attached to braces E, which are secured to the beams A and to the sides of the hopper C.

The coverers F for filling and throwing earth over the seeds are secured at their front ends to the side beams A and have their rear ends curved down and constructed to effect the desired result. The rear portions of the coverers F are elastic and normally spring away from the side beams A, thereby permitting the said coverers to yield when they meet with an unyielding obstruction. The drive-wheel G is journaled at its ends in the side beams A, the journals thereof preferably entering notches *a*, provided in the under side of the said beam A and being held in place in said notches *a* by the coverers F, which extend across and close the open side of the said notches. The journal of the drive-wheel G is extended and provided with sprocket-wheel *g*, around which passes a sprocket-chain *e* to transmit motion to the feed-roller H, which is journaled at its ends in the side of the hopper C, a journal on said feed-roller being provided with a sprocket-wheel *h*, around which the upper portion of the sprocket-chain *e* passes.

The feed-roller H is provided with two sets of teeth I and I', which are designed to agitate the seed and feed the same in a positive manner to the opening *j* in the bottom of the hopper C. The set of teeth I are spirally arranged around the roller from right to left, and the set of teeth I' are disposed in opposite direction—that is, they extend spirally around the roller from left to right. Each set of teeth terminates about midway of the ends of the roller, and in the operation of the machine the seed is fed from the sides of the hopper to the said opening *j*, which is located at a middle point in the bottom of the said hopper. The rear portion of the hopper is constructed to conform to the path traveled by the teeth of the feed-roller, thereby preventing the lodgment of the seed therein. For this purpose a sheet-metal strip J is arranged at the rear side of the hopper and is deflected outward opposite the feed-roller, as shown at *j'*, to conform to the circle traveled by the outer ends of the said teeth. This sheet-metal strip overhangs a portion of the feed-roller and slants to the top edge of the hopper. The teeth just clear the lower outwardly-curved portion of the said strip J.

The cut-offs K for regulating the size of the opening *j* are pivoted at their front ends to the bottom of the hopper C and have their rear ends projected through a slot in the rear side of the said hopper, so as to be conveniently grasped when it is desired to operate them.

The clevis L is of the ordinary shape and embraces the sides of the end piece B, to which it is pivotally connected by a pin $l$. The lower portion of this clevis is extended and curved downward and constructed to form a plow-point M, which is designed to open the ground and form a furrow, into which the seed is dropped. The point of the plow M is about in line with the pin $l$. Hence on turning the clevis to the right or the left the plow-point will always remain in the furrow. By having the plow-clevis constructed in one piece a combined clevis and plow is produced and the draft from the clevis is applied directly to the said plow, thereby relieving the frame of the planter of this strain and enabling the said frame to be constructed much lighter than would be possible if the said plow were attached thereto.

Having thus described my invention, what I claim, and desire to secure by Letters Patent, is—

A cotton-seed planter comprising the side beams A, having notches $a$ in their under side and connected at their front ends by piece B, a combined clevis and plow attached to the said piece B by pin $l$ and having the end of the plow approximately in the same vertical line with pin $l$, the hopper C, mounted on the rear ends of the beams A and having the centrally-disposed opening $j$ and having the deflected portion J, the feed-roller journaled in the hopper and provided with right and left spirally-arranged teeth, cut-offs K for regulating the size of opening J, the drive-wheel having its journals let into the notches $a$ and adapted to operate in the aforesaid feed-roller, and the coverers F, secured to the beams A and extending across the notches $a$ and constructed to yield at their rear ends, substantially as and for the purpose set forth.

In testimony whereof I affix my signature in presence of two witnesses.

WILLIAM SMITH WEST.

Witnesses:
W. G. McKENZIE,
R. L. GRIFFIN.